(12) United States Patent
Yanami et al.

(10) Patent No.: US 8,843,351 B2
(45) Date of Patent: Sep. 23, 2014

(54) DISPLAY PROCESSING TECHNIQUE OF DESIGN PARAMETER SPACE

(75) Inventors: Hitoshi Yanami, Kawasaki (JP);
Hirokazu Anai, Kawasaki (JP);
Hidenao Iwane, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 507 days.

(21) Appl. No.: 13/115,593

(22) Filed: May 25, 2011

(65) Prior Publication Data

US 2012/0046915 A1    Feb. 23, 2012

(30) Foreign Application Priority Data

Aug. 18, 2010    (JP) .................. 2010-183013

(51) Int. Cl.
*G06F 7/60* (2006.01)
*G06F 17/10* (2006.01)
*G06F 17/11* (2006.01)

(52) U.S. Cl.
CPC ............ *G06F 17/11* (2013.01); *G06F 2217/08* (2013.01)
USPC ................................. 703/2; 700/28

(58) Field of Classification Search
USPC .......................................................... 703/2
See application file for complete search history.

(56) References Cited

U.S. PATENT DOCUMENTS

| | | |
|---|---|---|
| 2009/0182539 A1 | 7/2009 | Anai et al. |
| 2010/0057410 A1 | 3/2010 | Yanami et al. |

FOREIGN PATENT DOCUMENTS

JP    2005-025445    1/2005

OTHER PUBLICATIONS

Fotiou et al, "Parametric Optimization and Optimal Control using Algebraic Geometry Methods", International Journal of Control, Feb. 2006.*
Yanami et al, "Multi-objective Design Based on Symbolic Computation and Its Application to Hard Disk Slider Design", Journal of Math for Industry, vol. 1 pp. 149-156, Oct. 4, 2009.*
Kanno et al, "Parametric Optimization in Control using the Sum of Roots for Parametric Polynomial Spectral Factorization", ISSAC, 2007.*
Fotiou et al, "Nonlinear Parametric Optimization Using Cylindrical Algebraic Decomposition", Proceedings of the 44th IEEE Conference on Decision and control, and the European Control Conference, 2005.*
Pang et al, "On Weighted Time Optimal Control for Linear Hybrid Automata using Quantifier Elimination", Proceedings of the 7th IFAC International Workshop on Discrete Event Systems, 2004.*
Hirokazu Anai et al., "Introduction to Computational Real Algebraic Geometry", Series No. 1, vol. 554, 20 pages, Nov. 2007.

(Continued)

*Primary Examiner* — Mary C Jacob
(74) *Attorney, Agent, or Firm* — Staas & Halsey LLP

(57) ABSTRACT

This method includes: generating a constraint equation from data of an approximate expression of a cost function representing a relationship between a plurality of design parameters and a cost, data of a route in a cost space and data of a search range in a design parameter space; obtaining a logical expression of a solution for the constraint equation from a quantifier elimination processing unit that carries out a processing according to a quantifier elimination method; substituting coordinates of each of a plurality of points within the search range in the design parameter space into the logical expression of the solution to determine, for each of the plurality of points, true or false of the logical expression of the solution; and displaying the design parameter space in which a display object including a first point for which true is determined is disposed at the first point.

10 Claims, 20 Drawing Sheets

(56) References Cited

OTHER PUBLICATIONS

Hirokazu Anai et al., "Introduction to Computational Real Algebraic Geometry", Series No. 2, vol. 555, 15 pages, Dec. 2007.

Hirokazu Anai et al., "Introduction to Computational Real Algebraic Geometry", Series No. 3, vol. 556, 22 pages, Jan. 2008.

Hirokazu Anai et al., "Introduction to Computational Real Algebraic Geometry", Series No. 4, vol. 558, 21 pages, Mar. 2008.

Hirokazu Anai et al., "Introduction to Computational Real Algebraic Geometry", Series No. 5, vol. 559, 18 pages, Apr. 2008.

Hirokazu Anai et al., "Design Technology Based on Symbolic Computation", Fujitsu, vol. 60, No. 5, pp. 514-521, Sep. 2009.

Mats Jirstrand, "Cylindrical Algebraic Decomposition—an Introduction", Oct. 18, 1995, pp. 1-38.

* cited by examiner

Or(
And(e = 0, 16*p-19+21*q = 0, 79+9*e-272*p-18*q+256*p^2 = 0),
And(e = 0, -19+16*p+21*q-3*e = 0, 256*p^2-272*p+79-18*q = 0),
And(16*p-19+21*q = 0, 256*p^2-272*p+79-18*q = 0, -e <= 0),
And(16*p-19+21*q = 0, 79-9*e-272*p-18*q+256*p^2 = 0, -e <= 0),
And(16*p+11+21*q = 0, 256*p^2-272*p+79-18*q = 0, -e <= -10),
And(16*p+11+21*q = 0, -11-9*e-272*p-18*q+256*p^2 = 0, -e <= 0),
And(-19+3*e+16*p+21*q = 0, 256*p^2-272*p+79-18*q = 0, -e <= 0),
And(16*p-19+21*q = 0, 256*p^2+272*p+18*q <= 79, -9*e-272*p-18*q+256*p^2 <=-79, -9*e+272*p+18*q-256*p^2 <= 79),
And(16*p+11+21*q = 0, -256*p^2+272*p-18*q+256*p^2 <= 79, -9*e-272*p-18*q+256*p^2 <=11, -9*e+272*p+18*q-256*p^2 <= -11),
And(16*p+11+21*q = 0, -256*p^2+272*p+18*q <= 79, -9*e-272*p-18*q+256*p^2 <=11, -9*e+272*p+18*q-256*p^2 <= -11),
And(256*p^2-272*p+79-18*q = 0, 16*p+21*q-18*q <= 19, 16*p+21*q-3*e <= 19, -3*e-16*p-21*q <= -19),
And(22+9*e-224*p+45*q+256*p^2 = 0, -e <= 0, 16*p+21*q <= 19, 3*e+16*p+21*q <= 19),
And(22+9*e-224*p+45*q+256*p^2 = 0, -e <= 0, -256*p^2+272*p+18*q <= 79, -9*e+272*p+18*q-256*p^2 <= 79),
And(-9*e-224*p+22+45*q+256*p^2 = 0, -e <= 0, 16*p+21*q-3*e <= 19),
And(-9*e-224*p+22+45*q+256*p^2 = 0, -e <= 0, -256*p^2+272*p+18*q <= 79, 9*e+272*p+18*q-256*p^2 <= 79),
And(16*p+21*q <= 19, -256*p^2+272*p+18*q <= 79, -9*e-224*p+45*q+256*p^2 <= -22, -9*e+224*p-45*q-256*p^2 <= 22)
)

FIG.8

| COORDINATES | TRUE / FALSE |
|---|---|
| (p1, q1) | FALSE |
| (p2, q2) | FALSE |
| (p3, q3) | TRUE |
| ⋮ | ⋮ |

US 8,843,351 B2

DISPLAY PROCESSING TECHNIQUE OF DESIGN PARAMETER SPACE

CROSS-REFERENCE TO RELATED APPLICATIONS

This application is based upon and claims the benefit of priority of the prior Japanese Patent Application No. 2010-183013, filed on Aug. 18, 2010, the entire contents of which are incorporated herein by reference.

FIELD

This technique relates to a technique for supporting multi-objective optimization design.

BACKGROUND

Generally, in a design stage of producing goods, by varying values of plural design parameters so as to minimize plural kinds of costs (also called "objective function"), optimum values of the plural design parameters are determined. However, in such multi-objective optimization design, generally, an optimum solution is not uniquely determined, and the trade-off relationship occurs among the costs. In other words, pareto optimum solutions are obtained.

Therefore, in the multi-objective optimization design, it is difficult to understand the relationship between the design parameters and the costs, and this causes a problem when a designer determines the optimum solutions of the design parameters. Especially, it is difficult to see changes of the design parameter values, which correspond to changes of the costs in a cost space that is mapped by plural kinds of costs.

In order to deal with this problem, a technique to show changes of the design parameters in a design parameter space when moving between 2 points (e.g. A and B) on a pareto curve in the cost space exists. In this technique, points P and Q in the design parameter space, which correspond to the points A and B on the pareto curve, are derived to extract a point R corresponding to a point on the pareto curve in the cost space among points on a perpendicular bisector to a segment connecting the points P and Q. In the following, the similar processing is carried out for a segment connecting the points P and R and a segment connecting the points R and Q, and when such a processing is further repeated so as to fragment the segments, it is possible to grasp the changes of the design parameters in the design parameter space when moving between the points A and B on the pareto curve. However, according to this method, the search in the design parameter space is limited to the perpendicular bisector. Therefore, this technique cannot deal with a case where there are plural routes in the design parameter space and a case where the route branches off on the way and/or plural routes are merged into one route. Furthermore, there is a problem that only the route on the pareto curve can be handled.

Moreover, a following technique exists. Namely, points in a predetermined region in the design parameter space are arranged in gridlike fashion, and corresponding points in the cost space are calculated. Then, when a designer designates a point or region in the cost space, a corresponding point or region in the design parameter space is shown. However, any idea that a route in the cost space is designated does not exist.

In the aforementioned techniques, it is impossible to grasp how values of the design parameters change when increasing or decreasing specific costs in the cost space, or grasp what condition of the design parameters should be eased in order to carry out design having better cost values regardless of the present feasible region. Specifically, it is not possible to grasp any corresponding route in the design parameter space when designating an arbitrary route in the cost space.

SUMMARY

A display processing method relating to this technique includes: (A) generating a constraint equation from data of an approximate expression of a cost function representing a relationship between a plurality of design parameters and a cost, data of a route in a cost space and data of a search range in a design parameter space; (B) obtaining a logical expression of a solution for the constraint equation from a quantifier elimination processing unit that carries out a processing according to a quantifier elimination method; (C) substituting coordinates of each of a plurality of points within the search range in the design parameter space into the logical expression of the solution to determine, for each of the plurality of points, true or false of the logical expression of the solution; and (D) displaying a design parameter space in which a display object including a first point for which true is determined among the plurality of points, is disposed at the first point.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 8 is a diagram depicting an example of a logical expression of a solution for a constraint equation;

DESCRIPTION OF EMBODIMENTS

Figure 1:
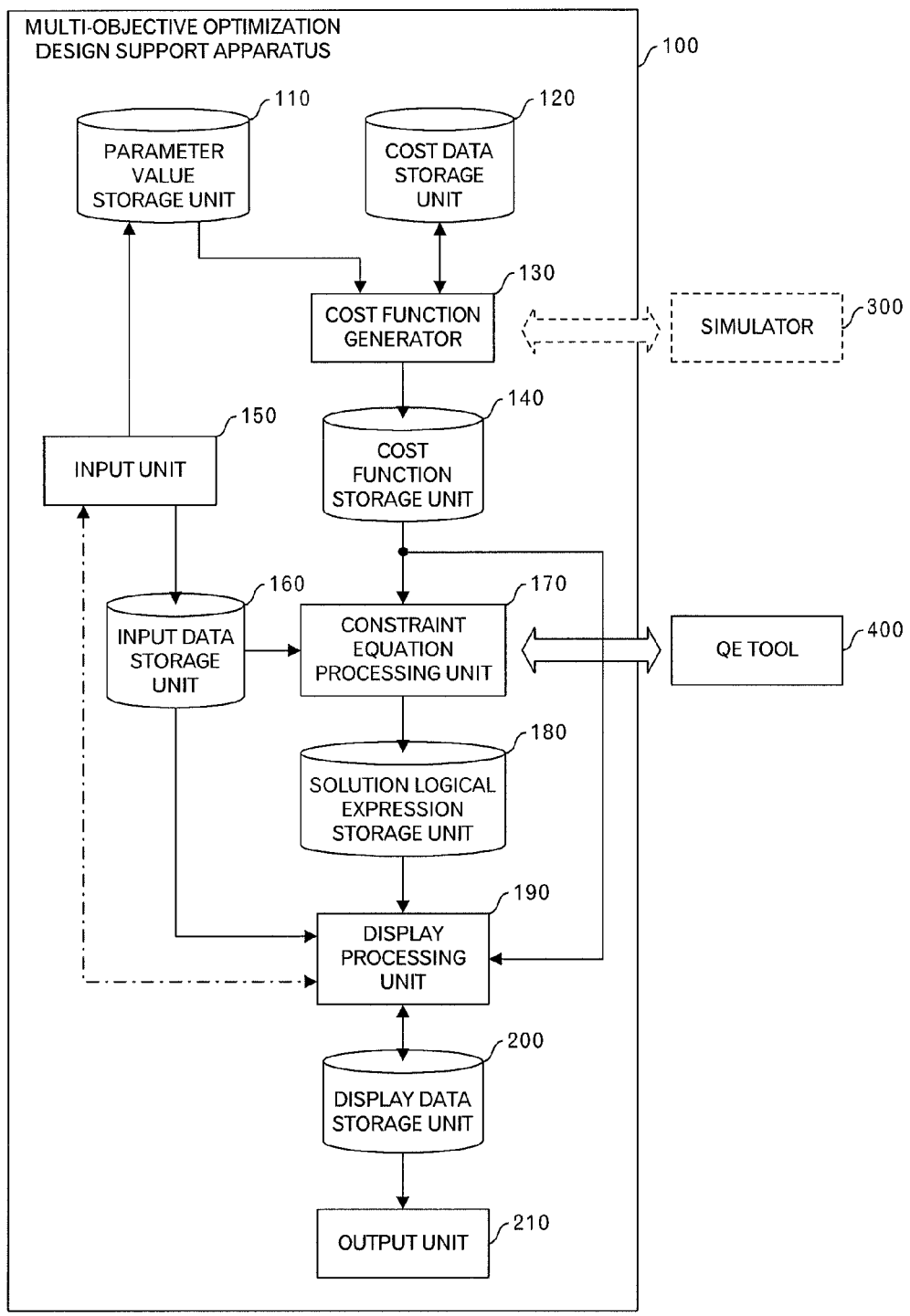
FIG. 1 is a functional block diagram of a multi-objective optimization design support apparatus relating to this embodiment.

FIG. 1 illustrates a functional block diagram of a multi-objective optimization design support apparatus 100 relating to an embodiment of this technique. This multi-objective optimization design support apparatus 100 has a parameter value storage unit 110, cost data storage unit 120, cost function generator 130, cost function storage unit 140, input unit 150, input data storage unit 160, constraint equation processing unit 170, solution logical expression storage unit 180, display processing unit 190, display data storage unit 200 and output unit 210.

The parameter value storage unit 110 stores plural parameter value sets for plural design parameters. Moreover, the cost data storage unit 120 stores plural cost value sets for respective costs, each cost value set corresponding to a parameter value set stored in the parameter value storage unit 110. The cost function generator 130 generates an approximate expression of a cost function using data stored in the parameter value storage unit 110 and cost data storage unit 120, and stores data of the generated approximate expression into the cost function storage unit 140. Incidentally, the cost function generator 130 may cooperate with a simulator 300, which is implemented in the same or other apparatus (typically, a computer). The simulator 300 has a function for calculating respective cost values when the parameter value set of the design parameters is inputted. Because this function of the simulator 300 conventionally exists, further explanation is omitted.

Moreover, the input unit 150 prompts a user (i.e. designer) to input data used in the processing, which will be explained, and accepts data input from the user, and stores the accepted data into the input data storage unit 160. Data of a route in the cost space (including coordinates of a start point), search region in the design parameter space, data for the width of the route in the cost space and drawing parameter values are included in the input data.

Incidentally, plural parameter value sets stored in the parameter value storage unit 110 may be inputted through the input unit 150. Moreover, the cost values of the respective costs, which will be stored in the cost data storage unit 120, may be inputted, similarly. Furthermore, the input unit 150 cooperates with the display processing unit 190.

Furthermore, the constraint equation processing unit 170 generates a constraint equation by using data stored in the cost function storage unit 140 and input data storage unit 160, carries out a processing by cooperating with a Quantifier Elimination (QE) tool 400, which is implemented in the same or different apparatus, to obtain a logical expression of a solution for the constraint equation, and stores the obtained data into the solution logical expression storage unit 180.

The QE tool 400 carries out computer algebra according to the quantifier elimination method. For example, a constraint equation "$\exists x(x^2+bx+c=0)$" concerning real numbers x, b and c is changed to an equivalent expression "$b^2-4c \geq 0$", in which the quantifiers ($\exists$ and $\forall$) are eliminated.

Specifically, see following documents. However, because a lot of documents for the QE exist, useful documents other than the following documents also exist.

Anai Hirokazu and Yokoyama Kazuhiro, "Introduction to Computational Real Algebraic Geometry", *Mathematics Seminar*, Nippon-Hyoron-sha Co., Ltd., "Series No. 1", Vol. 554, pp. 64-70, November, 2007, " Series No. 2", Vol. 555, pp. 75-81, December, 2007, " Series No. 3", Vol. 556, pp. 76-83, January, 2008, "Series No. 4", Vol. 558, pp. 79-85, March, 2008, " Series No. 5", Vol. 559, pp. 82-89, April, 2008.

Anai Hirokazu, Kaneko Junji, Yanami Hitoshi and Iwane Hidenao, "Design Technology Based on Symbolic Computation", *FUJITSU*, Vol. 60, No. 5, pp. 514-521, September, 2009.

Jirstrand Mats, "Cylindrical Algebraic Decomposition— an Introduction", Oct. 18, 1995.

Thus, because the QE itself is a known technique, further explanation is omitted.

The display processing unit 190 uses data stored in the cost function storage unit 140, input data storage unit 160 and solution logical expression storage unit 180 to generate display data to display a route in the design parameter space, and stores the display data into the display data storage unit 200. The output unit 210 outputs the data stored in the display data storage unit 200 to an output device such as a display device or printer.

Figure 2:
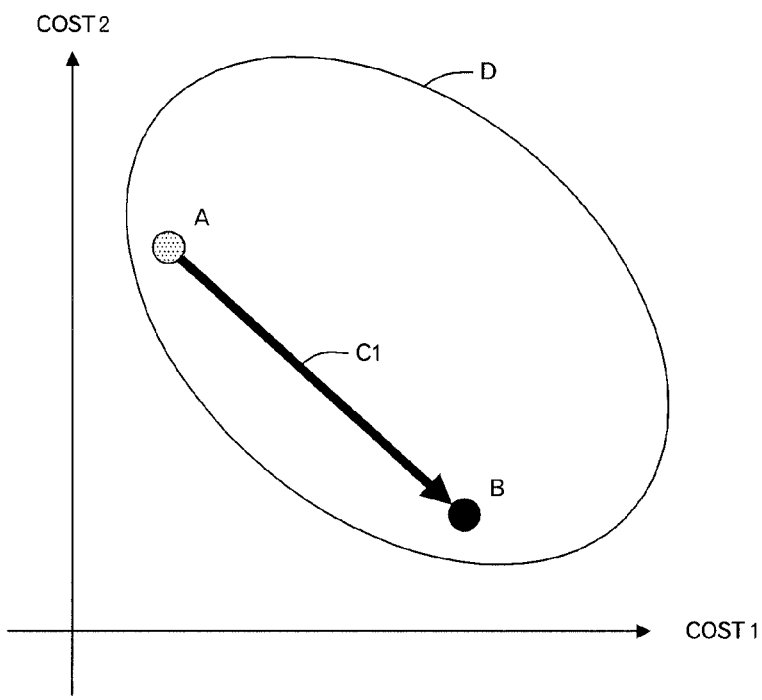
FIG. 2 is a diagram depicting an example of a cost space in the embodiment.
Figure 3:
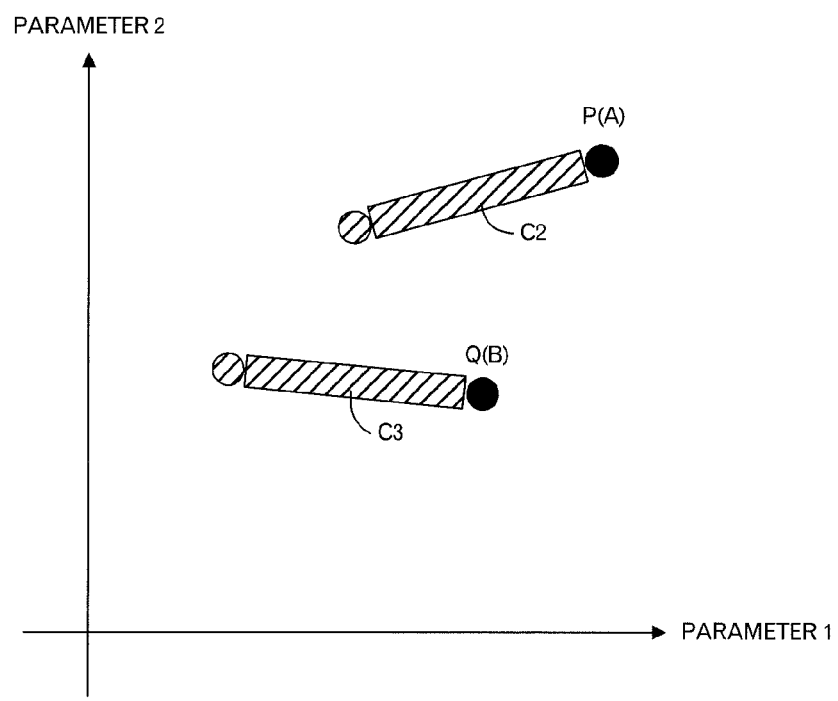
FIG. 3 is a diagram depicting an example of a design parameter space in the embodiment.

Functions of this multi-objective optimization design support apparatus 100 will be schematically explained by using FIGS. 2 and 3. FIG. 2 illustrates a cost space (a plane in FIG. 2, generally, n-dimensional space (n is the number of costs)) mapped by the costs "cost1" and "cost2", and a start point A and route C in the cost space are designated by a user. Incidentally, an end point B may be designated. However, when an expression of a route C1 (including a variation range of the cost value) is designated, the end point B may not be designated. In response to this input, the multi-objective optimization design support apparatus 100 identifies a route in the design parameter space as illustrated in FIG. 3, which corresponds to the route in the cost space, and displays the identified route to the display device or the like. In an example of FIG. 3, point P(A) and point Q(B) are illustrated in the two-dimensional space mapped by parameters 1 and 2. The point P corresponds to the start point A, and the point Q corresponds to the end point B. In addition, generally, the design parameter space is the m-dimensional space (m is the number of kinds of the design parameters.). However, in order to display the design parameter space, two or three design parameters, which are noticeable, are selected. Then, the routes C2 and C3, which extends from each of P (A) and Q(B), are also illustrated. Incidentally, the end point of the route in the cost space may also be displayed in the design parameter space. Moreover, the width to be judged to be included within the route in the cost space may also be changed in response to the designation from the user, and as described below, it is possible to change the resolution in the design parameter space in response to the designation from the user.

Next, an operation of the multi-objective optimization design support apparatus 100 relating to this embodiment will be explained using FIGS. 4 to 22.

Figure 4:
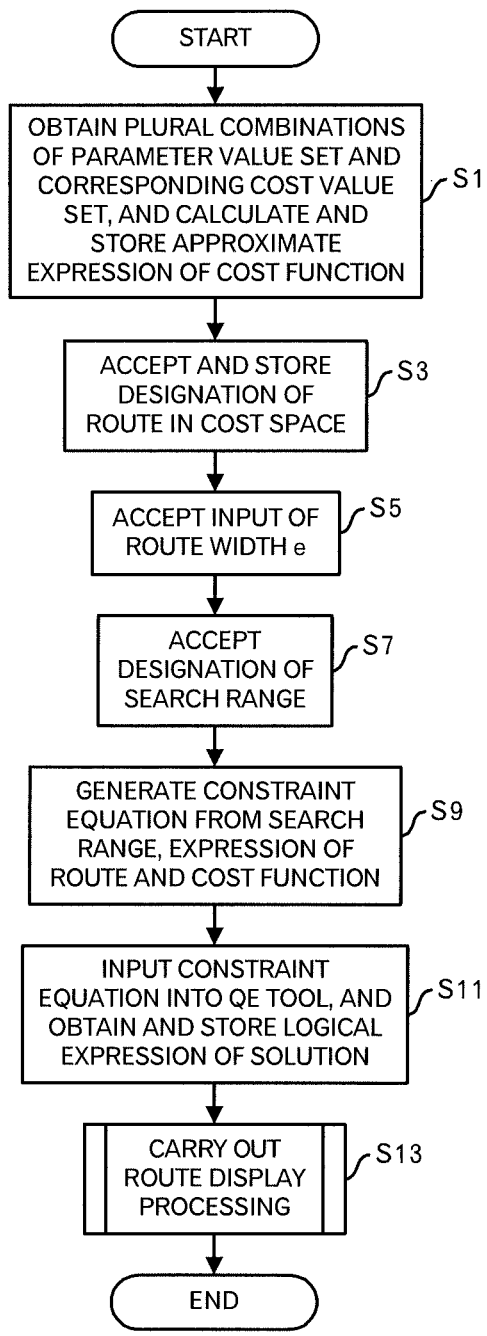
FIG. 4 is a diagram depicting a main processing flow in the embodiment.

The cost function generator 130 obtains plural combinations of the parameter value set for the plural design parameters and the corresponding cost value set to calculate an approximate expression of a cost function for each cost, and stores data of the calculated approximate expression of the cost function into the cost function storage unit 140 (FIG. 4: step S1).

As described above, the parameter value sets for the plural design parameters are stored in the parameter value storage unit 110. Instead of the parameter value sets themselves, an expression or rule for generating the parameter value sets may be stored. For example, in the variation ranges of the design parameters, which are set in advance, the parameter values may be randomly generated or may be regularly generated at regular intervals.

Moreover, the corresponding cost value sets are stored in the cost data storage unit 120, when they are prepared in advance. On the other hand, when the corresponding cost value set is not prepared in advance, the cost function generator 130 inputs the parameter value set stored in the parameter value storage unit 110 into the simulator 300, for example, to cause the simulator 300 to generate the corresponding cost value set, obtains the cost value set from the simulator 300, and stores the cost value set into the cost data storage unit 120. When this processing is carried out for each parameter value set stored in the parameter value storage unit 110, plural corresponding cost value sets can be obtained.

The approximate expression of the cost function is derived for each cost by using a well-known method such as the multiple regression analysis from the plural parameter value sets and corresponding cost values. Instead of the multiple regression analysis, other polynomial approximation method may be employed.

For example, when there are two design parameters p and q and two costs x and y, it is assumed that the following approximate expression of the cost function is obtained.

$$x=f(x,y)=(256/9)*p^2-(272/9)*p-2*q+124/9 \quad (1)$$

$$y=g(x,y)=(16/3)*p+7*q+11/3 \quad (2)$$

Figure 5:
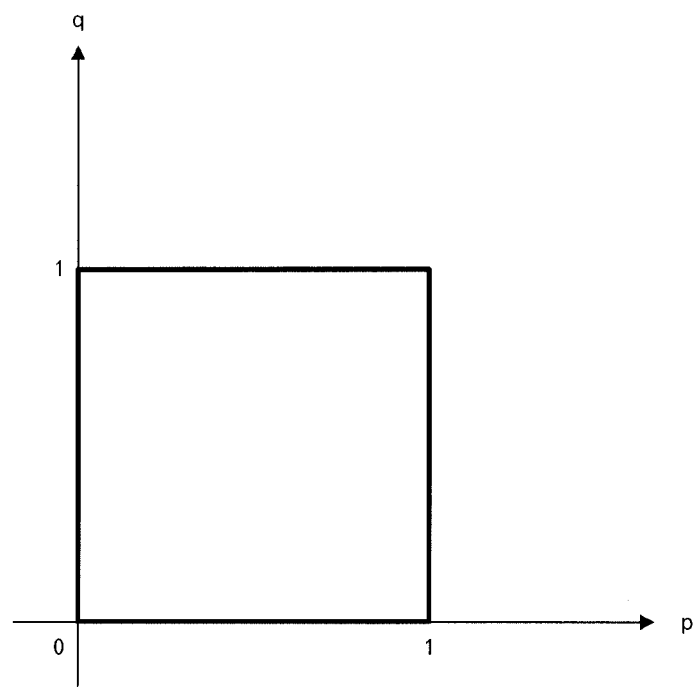
FIG. 5 is a diagram depicting an example of the design parameter space.
Figure 6:
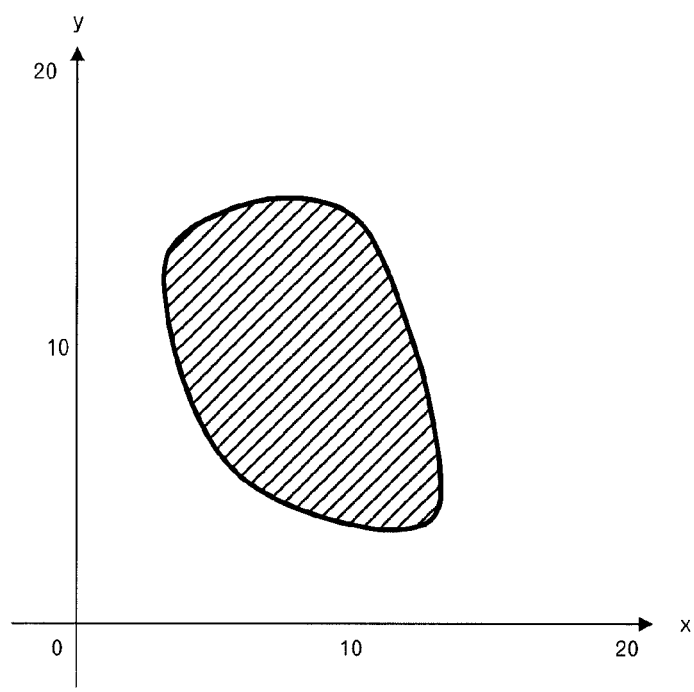
FIG. 6 is a diagram depicting an example of the cost space.

For example, as depicted in FIG. 5, when the variation ranges of the design parameter p and q are $0 \leq p \leq 1$ and $0 \leq q \leq 1$, the costs x and y vary in a hatched region like an ellipse as illustrated in FIG. 6 (called feasible region).

Next, the input unit 150 prompts the user to designate a route in the cost space, accepts the designation of the route from the user, and stores data of the route into the input data storage unit 160 (step S3). At this step, inputs of coordinates of the start point and data of the expression representing the route are accepted and stored into the input data storage unit 160. The coordinates of the end point may be inputted.

Figure 7:
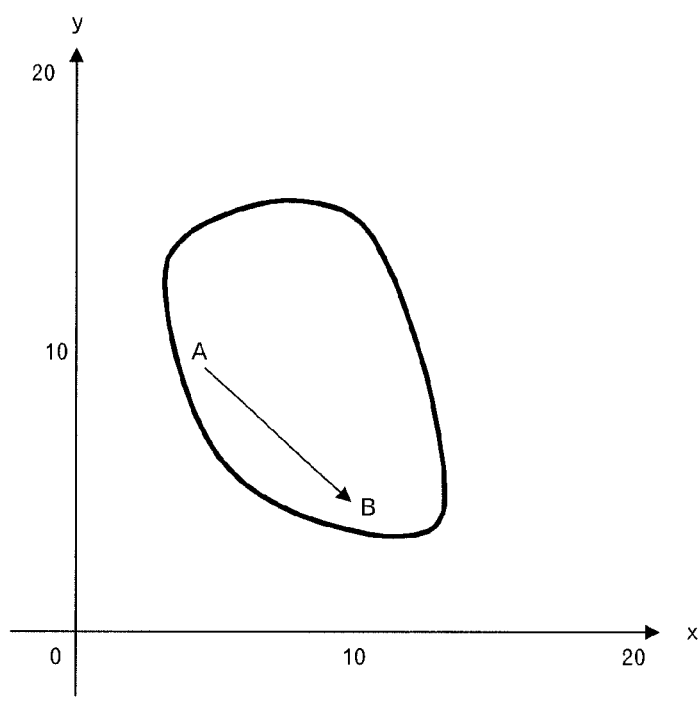
FIG. 7 is a diagram depicting an example of a route in the cost space.

For example, as depicted in FIG. 7, it is assumed that the start point A(5, 10), end point B(10, 5), and expressions "x+y=15" and "$5 \leq x \leq 10$" are designated.

Moreover, the input unit 150 prompts the user to input a route width e in the cost space, accepts an input of the route width e from the user, and stores data of the route width e into the input data storage unit 160 (step S5). This route width e can be changed by the user after confirming the state of the display. However, an initial value of the width e is inputted, here. On the other hand, the initial value may be a fixed value, and in such a case, the initial value of the route width e is stored, for example, in the input data storage unit 160, in advance.

Furthermore, the input unit 150 prompts to the user to designate a search range of the route in the design parameter space, accepts the designation of the search range of the route from the user, and stores data of the search range of the route into the input data storage unit 160 (step S7). For example, the same ranges as the variation ranges of the design parameters may be designated, or the search ranges including the outside of the variation ranges of the design parameters maybe designated. On the other hand, a narrower range than the variation range of the design parameter may be designated. In an example described below, a wider range than the variation range of the design parameter is designated as the search range. In order to search how to ease the condition of the design parameter in order to conduct the design having the further better cost value regardless of the current variation range of the parameter value, the wider search range is effective.

Incidentally, the order of the steps S1 to S7 is arbitrary. Namely, the order may be exchanged or the steps may be executed in parallel.

Then, the constraint equation processing unit 170 generates a constraint equation that is an input to the QE tool 400, from the search range and expression of the route, which are stored in the input data storage unit 160, and the cost function stored in the cost function storage unit 140, and stores data of the constraint equation into a storage unit such as a main memory (step S9).

As for the aforementioned example, the following constraint equation is generated.

$$\exists x \exists y [-0.5 \leq p \leq 1.5 \wedge -0.5 \leq q \leq 1.5 \wedge x=f(p,q) \wedge y=g(p,q) \wedge d((x,y),l)<e] l=\{(x,y) \in R^2 | x+y=15 \wedge 5 \leq x \leq 10\}$$

"l" means the expression of the route. Moreover, d((x, y), l)<e represents a constraint that the distance between the point (x, y) in the cost space and the route "l" is less than the route width "e".

Thus, the constraint equation is generated by connecting, with AND, the search ranges of the design parameters ($-0.5 \leq p \leq 1.5 \wedge 0.5 \leq q \leq 1.5$), cost function and constraint that the distance with the route "l" is less than the route width "e".

Then, the constraint equation processing unit 170 inputs the generated constraint equation into the QE tool 400, obtains data of the logical expression of the solution for the constraint equation, and stores the obtained data into the solution logical expression storage unit 180 (step S11). The QE tool 400 is well-known, and it is assumed that the logical expression of the solution for the constraint equation is successfully obtained.

The logical expression of the solution for the constraint equation of the aforementioned example is a logical expression as depicted in FIG. 8. In FIG. 8, 16 expressions, each of which are connected by AND, are ORed. Because the variables are the design parameters p and q and route width e, it is possible to determine whether this logical expression of the solution is true or false, when these values are inputted.

Figure 9:
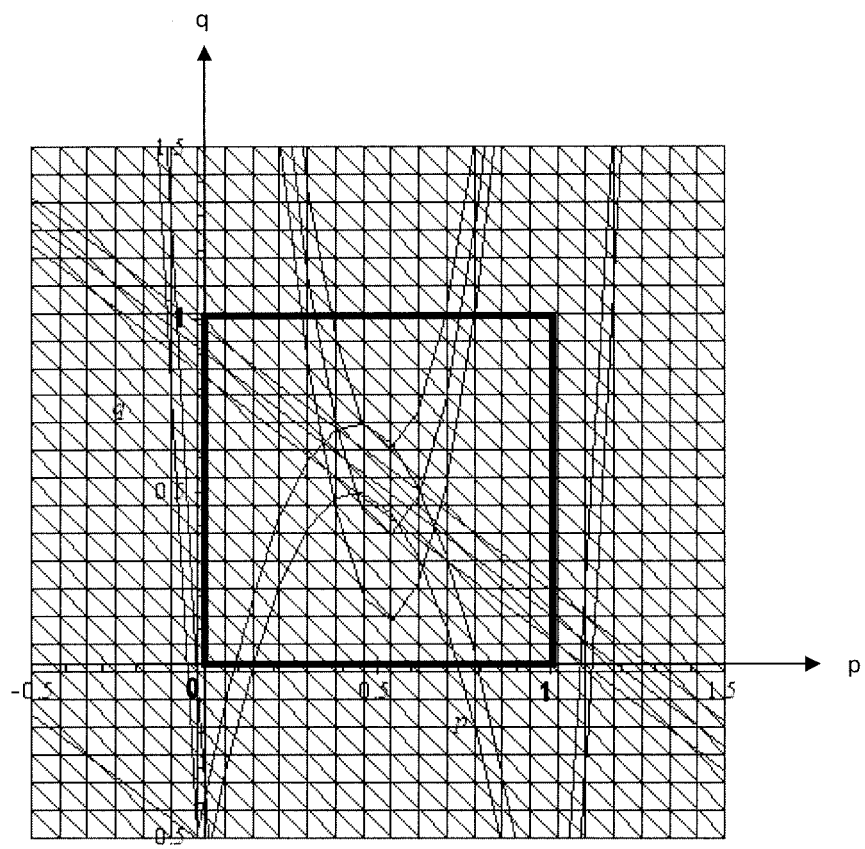
FIG. 9 is a diagram depicting the design parameter space in which the example of the logical expression of the solution for the constraint equation is represented.

Incidentally, when the logical expression of the solution is obtained as depicted in FIG. 8, it is possible to derive the logically correct route in the design parameter space. However, generally, the logical expression of the solution is very complicated as depicted in FIG. 8. When the example of FIG. 8 is illustrated, a graph depicted in FIG. 9 is obtained. However, because it takes a long processing time to identify an expression corresponding to the route in the cost space among a lot of expressions. Therefore, a following processing is carried out.

Next, the display processing unit 190 carries out a route display processing by using data stored in the input data storage unit 160 and solution logical expression storage unit 180 (step S13). This route display processing will be explained by using FIGS. 10 to 22.

Figure 10:
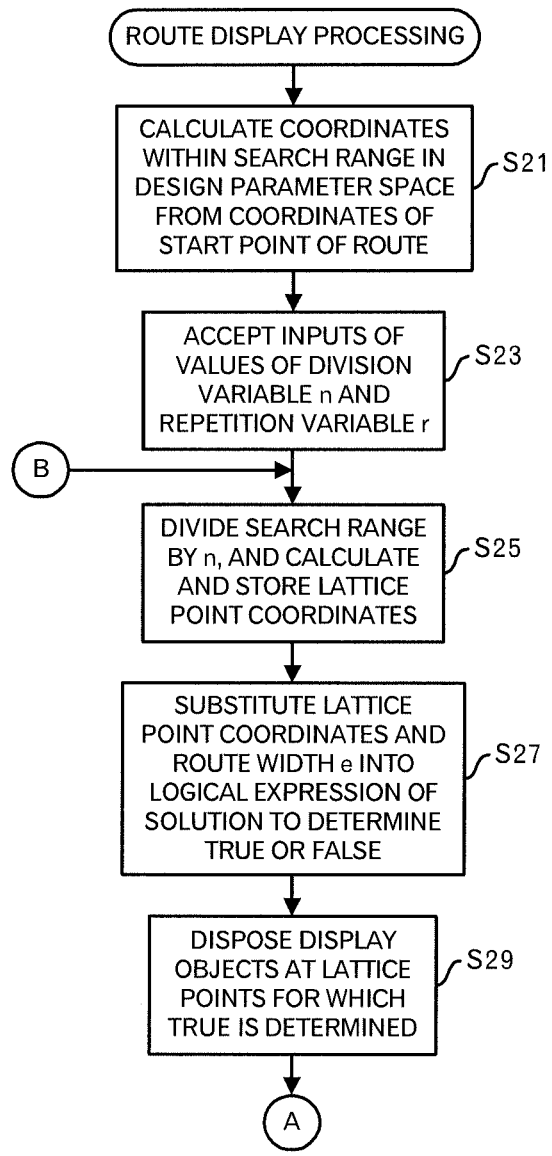
FIG. 10 is a diagram depicting a processing flow of a route display processing.

Shifting to explanation of a processing in FIG. 10, the display processing unit calculates coordinates within the search ranges in the design parameters from the coordinates of the start point of the route, which is stored in the input data storage unit 160, and the cost function stored in the cost function storage unit 140, and stores the calculated coordinates into the display data storage unit 200, for example (step S21).

When the simultaneous equations are solved by substituting the coordinates $(x_a, y_a)$ of the start point in the cost space into the cost function $x=f(p, q)$ and $y=g(p, q)$, the coordinates of the start point in the design parameter are obtained. However, when the coordinates are out of the search range, the coordinates are not employed. Typically, at least one set of coordinates within the search range is obtained. However, when no coordinates within the search range are obtained, the occurrence of the error is displayed to the user to prompt the user to input the data of the route or the search range again. Incidentally, the end point of the route can be calculated, similarly.

In addition, the display processing unit 190 requests the input unit 150 to input a division variable n in the design parameter space and a repetition variable r. In response to this, the input unit 150 prompts the user to input these values. Then, the input unit 150 accepts inputs of values of the division variable n and repetition variable r from the user, and outputs the inputted data to the display processing unit 190. The display processing unit 190 receives data from the input unit 150, and stores the received data into the display data storage unit 200 or the like (step S23). As explained below, the greater n and r are, the correcter the displayed region becomes. The processing load also becomes higher.

Figures 11, 12:
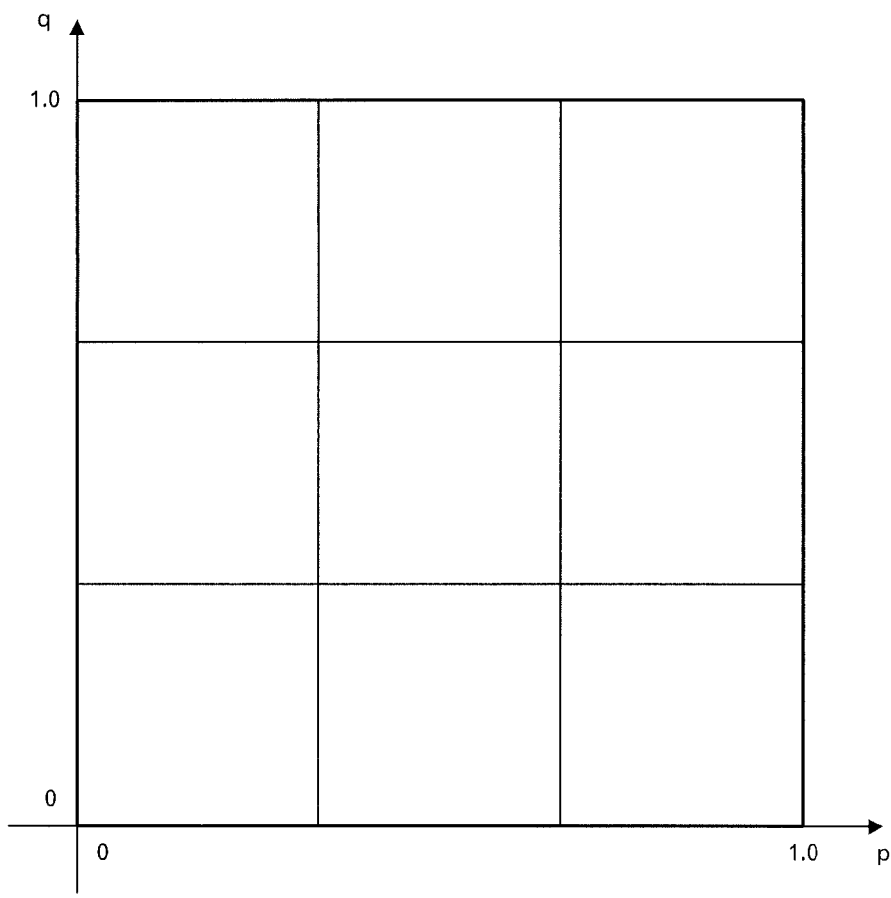
FIG. 11 is a diagram to explain division of the design parameter space.
FIG. 12 is a diagram depicting an example of coordinate data stored in a display data storage unit.

Then, the display processing unit 190 respectively divides the search region stored in the input data storage unit 160 by "n" in gridlike fashion to calculate coordinates of lattice points, and stores the calculated coordinates into the display data storage unit 200, for example (step S25). For example, as depicted in FIG. 11, when the design parameter space is a two-dimensional space, the search ranges are $0 \leq p \leq 1$ and $0 \leq q \leq 1$, and n=3 is designated, 9 rectangles (here, squares) are generated and 16 lattice points are obtained. The coordinates of these 16 lattice points are calculated. Typically, as for the m-dimensional design parameter space, $(n+1)^m$ lattice points are obtained.

In addition, the display processing unit 190 determines whether the logical expression of the solution is true or false, by substituting the value of the route width e and the lattice point coordinates into the logical expression of the solution, which is stored in the solution logical expression storage unit 180 (step S27). For example, data as depicted in FIG. 12 is stored in the display data storage unit 200. In an example of FIG. 12, coordinates and true/false flag are registered.

Figure 13:
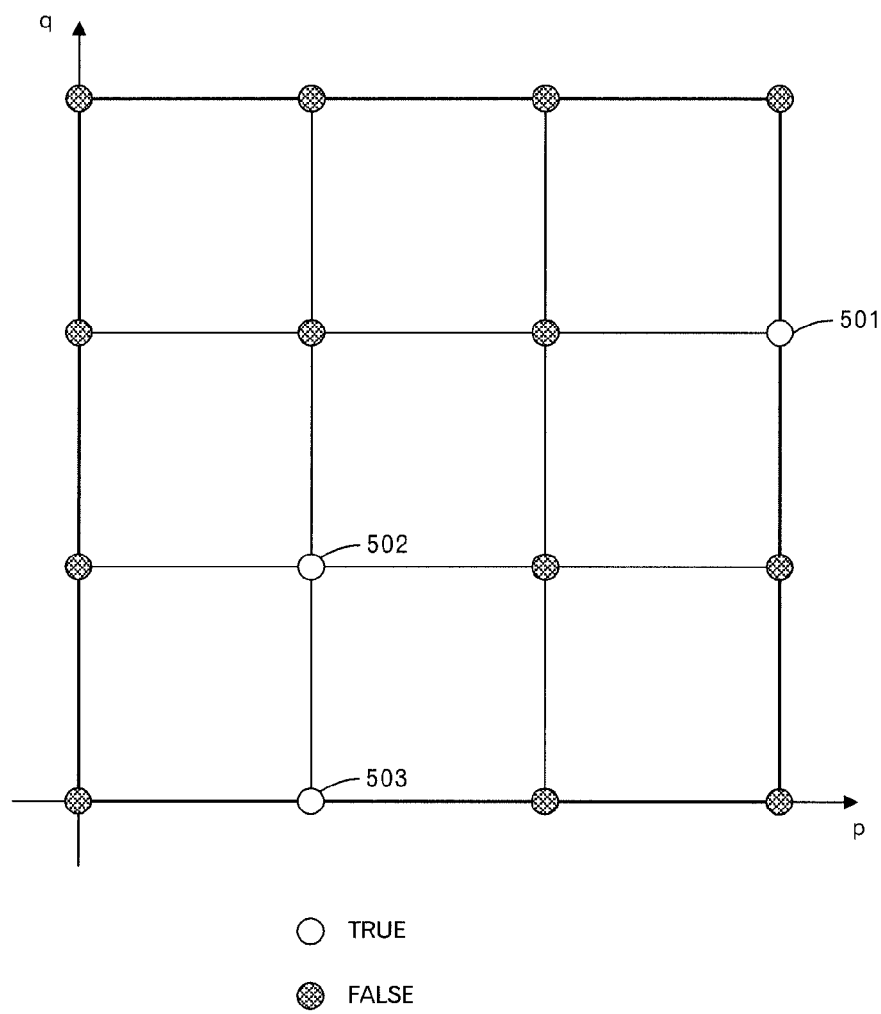
FIG. 13 is a diagram depicting an example of true or false determination of the logical expression of the solution.
Figure 14:
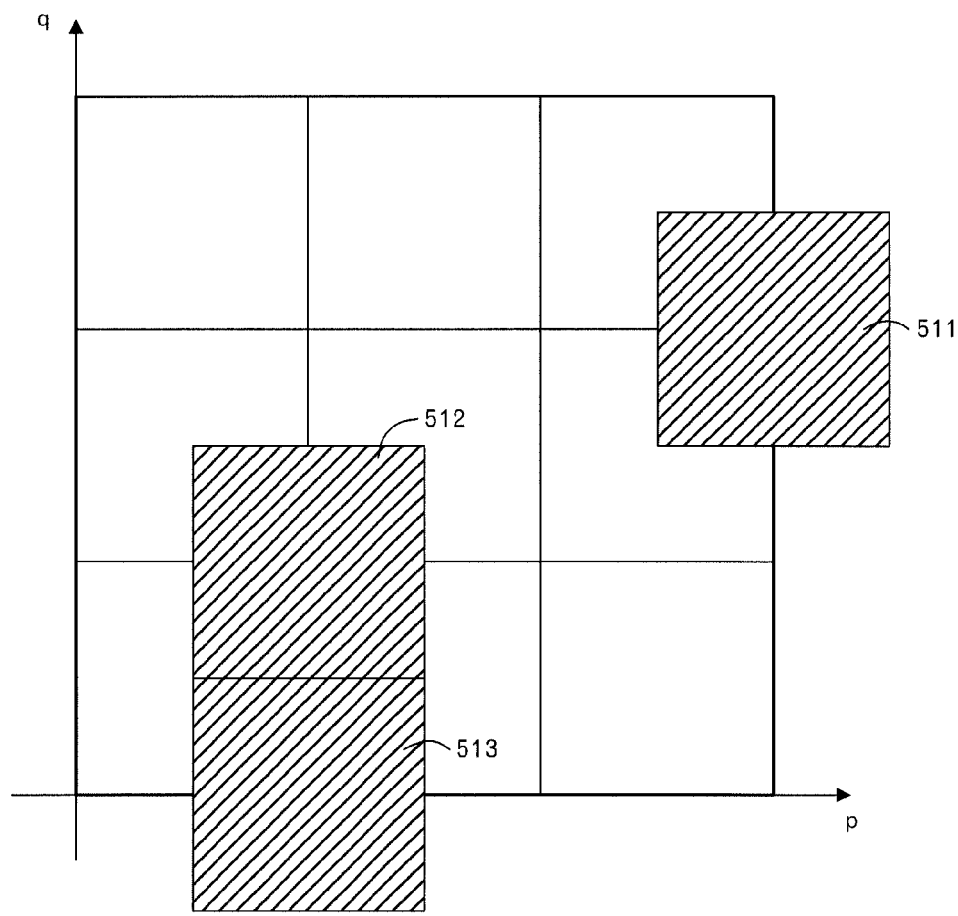
FIG. 14 is a diagram depicting a disposition example of display objects.

When the determination result of the true or false is disposed in the design parameter space, a graph as depicted in FIG. 13 is obtained. In an example of FIG. 13, only three lattice points 501 to 503 are determined to be true.

Then, the display processing unit 190 disposes display objects at the lattice points that are determined to be true (step S29). As for the example of FIG. 13, for the three lattice points 501 to 503, display objects 511 to 513 having the same size as one section of the lattice (i.e. 1/n of the search range for each design parameter) are disposed. These display objects 511 to 513 are regions representing the outer edge of the route in the design parameter space at the initial stage. Incidentally, the display objects having the size different from one section of the lattice may be disposed at the initial stage. Moreover, the shape may be different from one section of the lattice. Furthermore, at this stage, the design parameter space may be shown to the user. The processing shifts to a processing of FIG. 15 through a terminal A.

Incidentally, although an example that two design parameters are used is depicted, there are a lot of cases where the number of design parameters is more than "2", actually. However, even when the display of the design parameter space is the main object, the human cognition is limited to two or three-dimensional space. Moreover, it is better in view of the processing load to limit the number of design parameters to 2 or 3. For example, in the processing of the display processing unit 190, the parameter values of the design parameters other than the noticeable design parameters are fixed to constant values. In such a case, at the step S23, the input unit 150 causes the user to designate the noticeable design parameters, and causes the user to input the fixed values for the other design parameters, for example. In the following explanation, it is assumed that the display object is a two or three-dimensional object in this embodiment.

Figure 15:
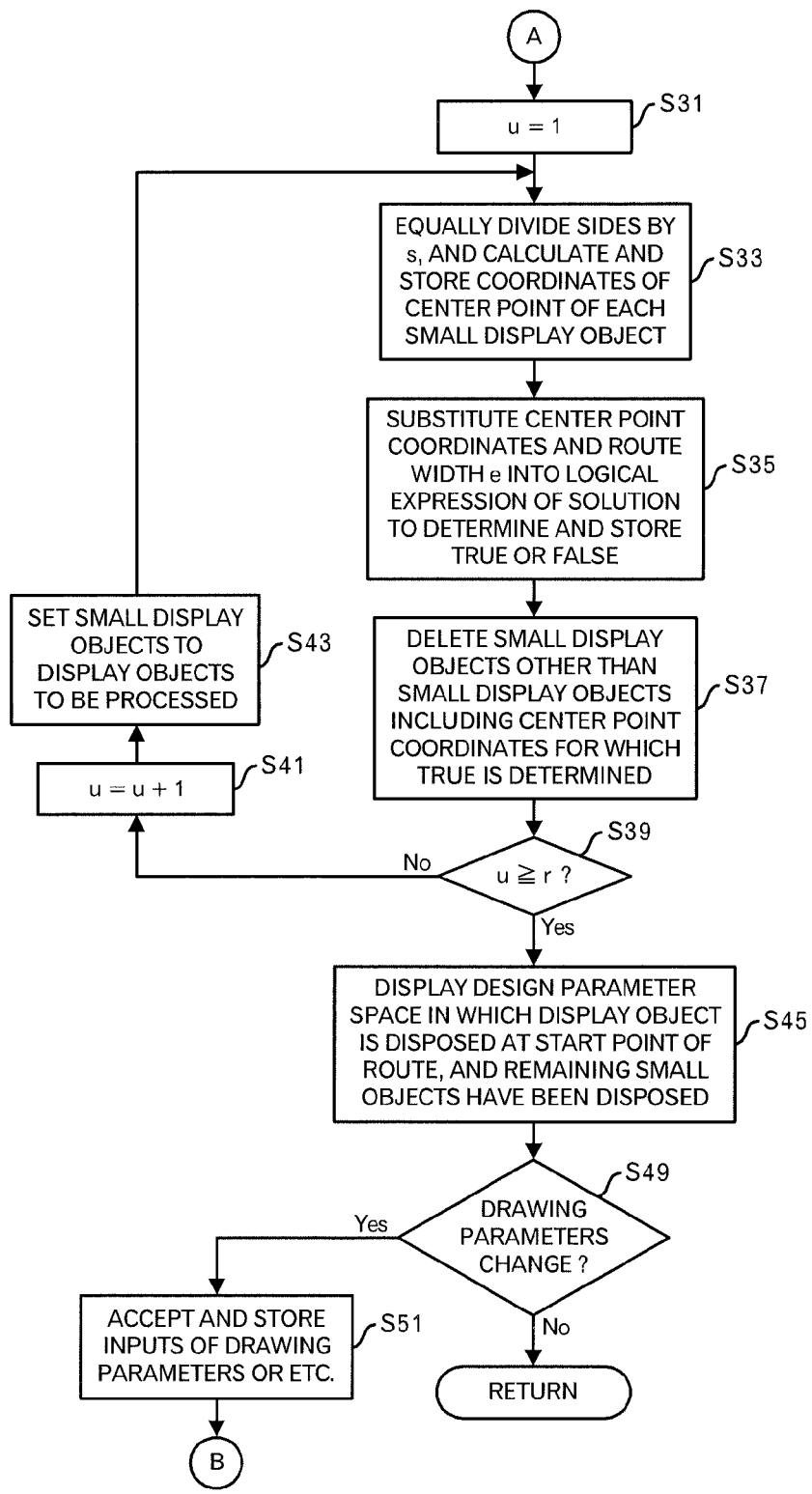
FIG. 15 is a diagram depicting a processing flow of a route display processing.
Figure 16:
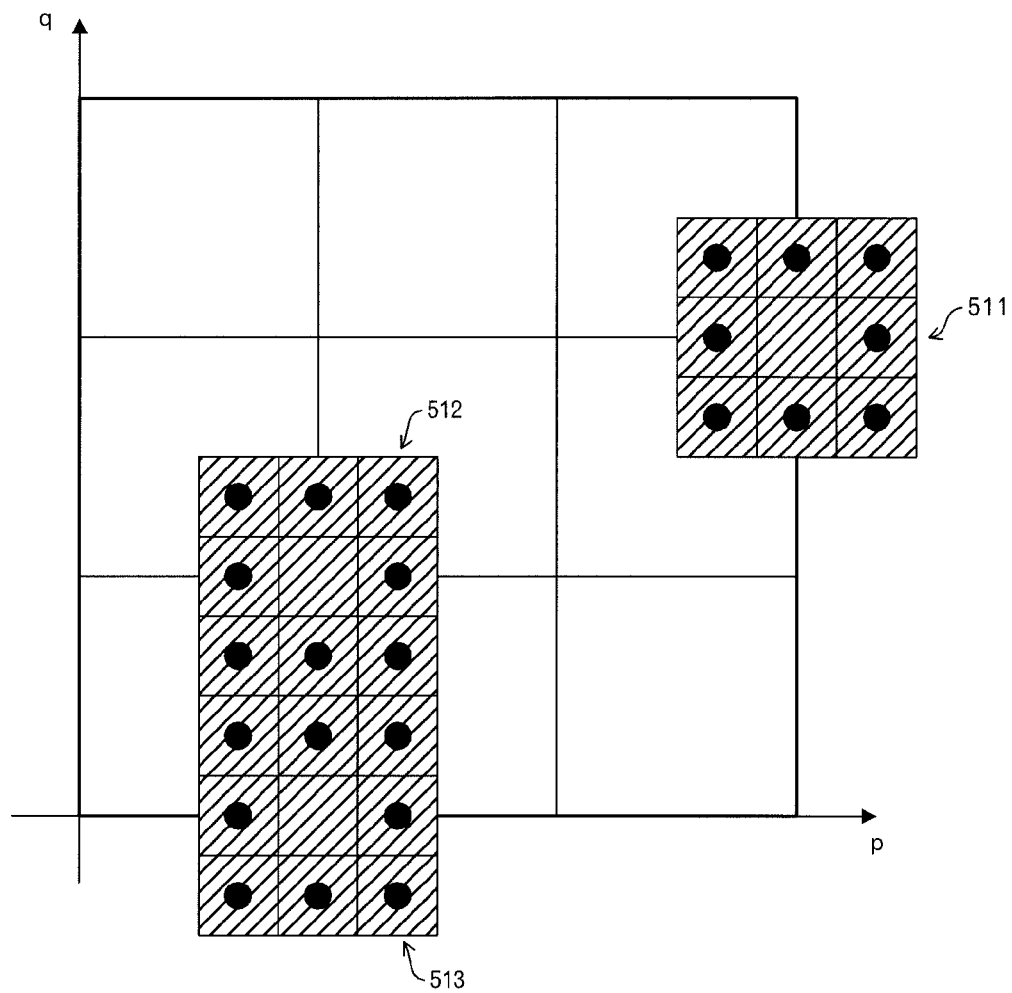
FIG. 16 is a diagram to explain subdivision of the display object.

Shifting to explanation of the processing of FIG. 15, the display processing unit 190 initializes a counter u to "1" (step S31). Then, the display processing unit 190 equally divides one side of the display object by "s", calculates coordinates of the center of each small display object, which is obtained by dividing the display objects, and stores the calculated coordinates into the display data storage unit 200, for example, (step S33). For example, the coordinates are additionally registered into a table as depicted in FIG. 12. In addition, when s=3 is set, for example, the state illustrated in FIG. 14 shifts to a state illustrated in FIG. 16. As depicted in FIG. 16, each of the display objects 511 to 513 is divided into 9 small display objects. In FIG. 16, a black circle is disposed at the center of the small display object. In this case, when the coordinates of the center of the small display object are identical to those of the lattice point or center of the display object, which were calculated before, the aforementioned coordinates of the center are excluded from the coordinates to be calculated. Incidentally, in case of the three-dimensional design parameter space, one display object is equally divided into 27 small display objects. When "s" is an odd number, there are small display objects having coordinates once the determination of true or false has been carried out. Therefore, it is possible to reduce the number of times of the determination processing by eliminating the duplicate determination of true or false.

Figure 17:
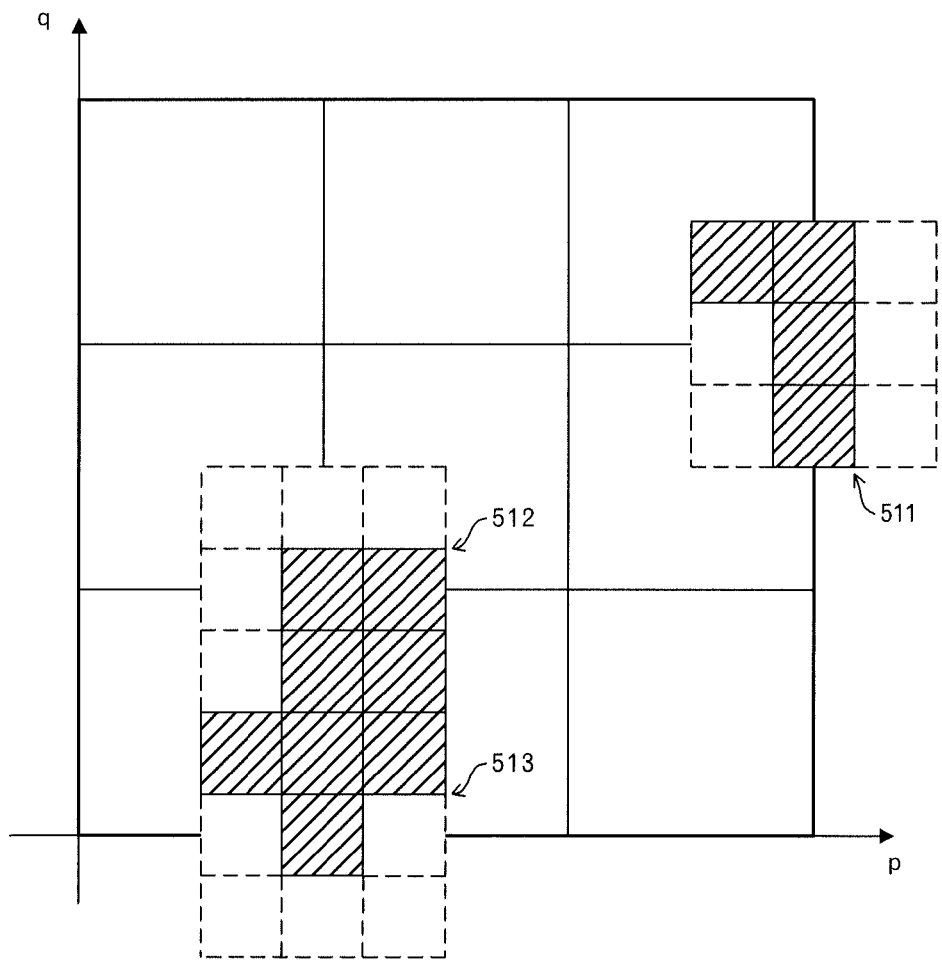
FIG. 17 is a diagram to explain the subdivision of the display object.

Moreover, similarly to the step S27, the display processing unit 190 substitutes the coordinates of the center and values of the route width e into the logical expression of the solution to determine the true or false of the logical expression of the solution, and stores the determination results into the display data storage unit 200 (step S35). Then, the display processing unit 190 deletes the small display objects other than the small display objects having the center coordinates that were determined to be true (step S37). Namely, the small display object having the coordinates of the center that were determined to be false is deleted. When the determination of FIG. 16 is reflected, a state illustrated in FIG. 17 is obtained, for example. In case of the display object 511, 5 small display objects, which are represented by a dotted line, are deleted, in case of the display object 512, 5 small display objects in the left side and top side, which are represented by the dotted line, are deleted, and in case of the display object 513, 5 small objects in the mainly bottom side, which are represented by the dotted line, are deleted.

Next, the display processing unit 190 determines whether or not the value of the counter u becomes equal to or greater than the repetition variable r (step S39). When u is less than r, the display processing unit 190 increments u by "1" (step S41), and sets the small display objects to the display objects to be processed. Then, the processing returns to the step S33 (step S43).

Incidentally, the greater the value of the repetition variable r is, the smaller the small display object becomes. Therefore, the regions whose boundary is smooth are obtained.

Figure 18:
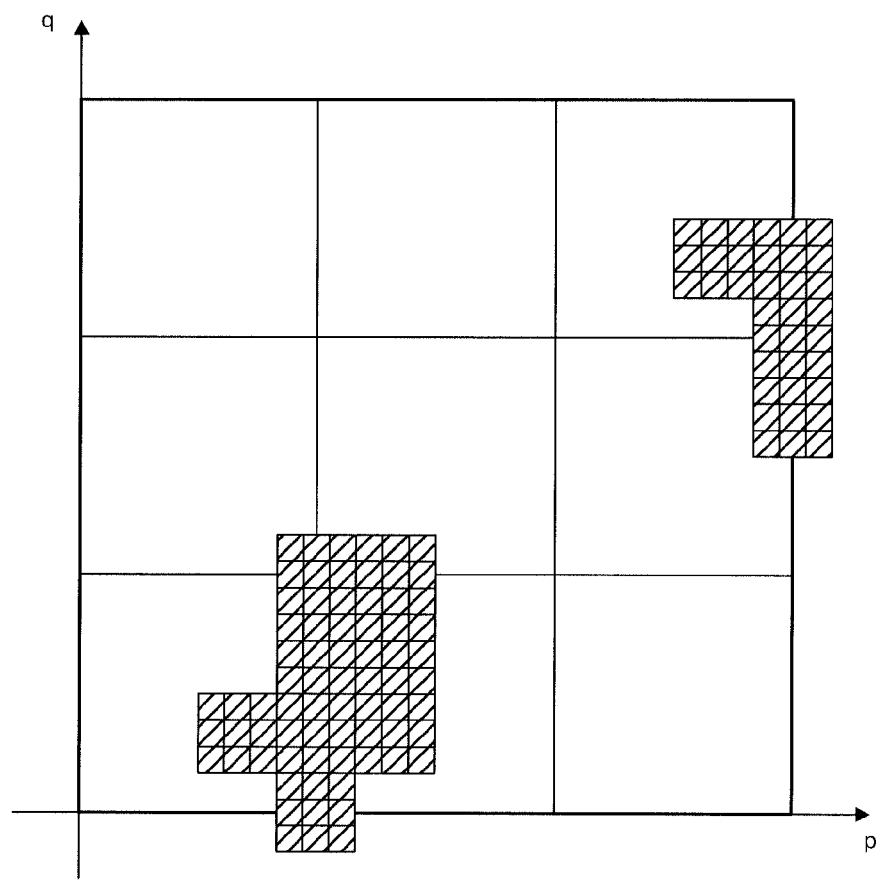
FIG. 18 is a diagram to explain the subdivision of the display object.

For example, as depicted in FIG. 18, one side of the small display object is equally divided by "s" to generate small display objects, which has smaller size, calculates their coordinates of the centers, and respectively determines true or false of the logical expression of the solution by substituting the value of the route width e and the coordinates of the center into the logical expression of the solution. In the following, the similar processing will be carried out.

In this way, when the value of the counter u reaches the value of the repetition variable r, the display processing unit 190 disposes, in the design parameter space, a display object that represents it is the start point at a coordinate position calculated at the step S21 (a point within the design parameter space, which corresponds to the start point of the route in the cost space), generates display data to display the design parameter space in which the small display objects remained in the aforementioned processing have been disposed, and stores the generated display data into the display data storage unit 200. Then, the output unit 210 outputs the display data stored in the display data storage unit 200 to the display device or the like (step S45).

Figure 19:
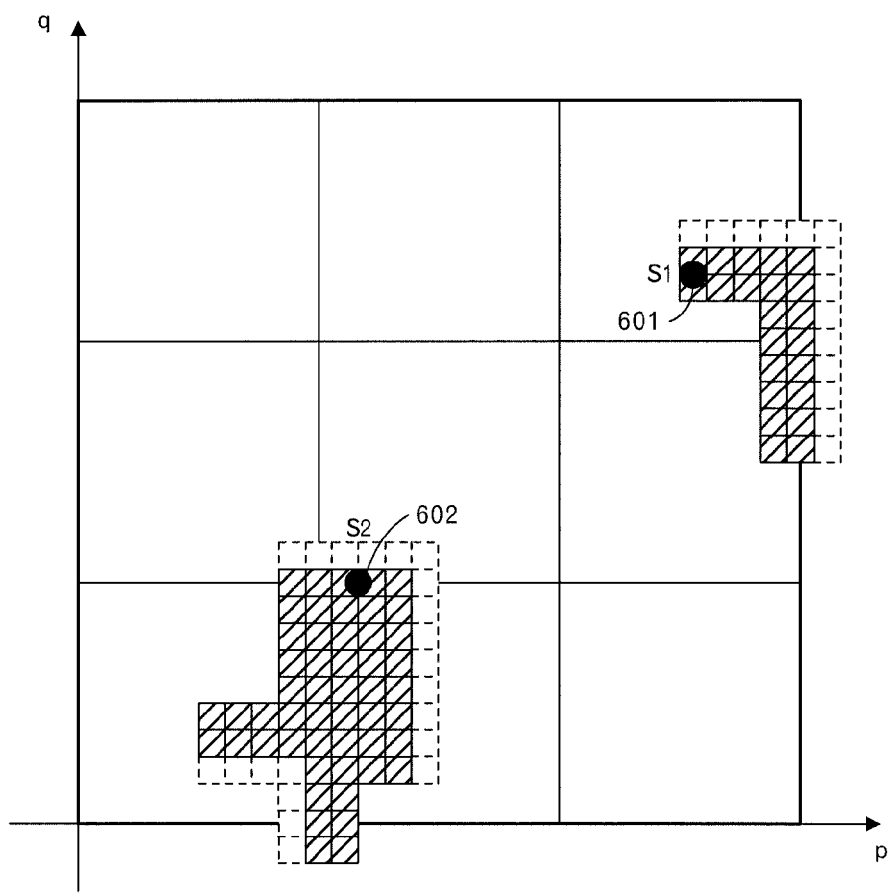
FIG. 19 is a diagram to explain the subdivision of the display object.

For example, display as depicted in FIG. 19 is carried out. In an example of FIG. 19, the small display objects, which are represented by the dotted line are deleted from the state of FIG. 18, and the display objects 601 and 602 that correspond to the start points S1 and S2 in the design parameter space are displayed. In this way, there is one route in the cost space. However, two separate routes exist in the design parameter space. Furthermore, it can be understood that a portion of the route relating to the start point S2 branches out.

However, because the line is too thick to understand the details of the line. In addition, in other view points, there is a case where the division variable n, repetition variable r, or route width e should be changed. In such a case, the user instructs the input unit 150, for example.

When change of the drawing parameter such as the division variable n, repetition variable r and route width e is instructed (step S49: Yes route), the input unit 150 accepts an input from the user, and outputs the accepted data to the display processing unit 190 (step S51). The display processing unit 190 stores the drawing parameters or the like into the display data storage unit 200. A changed value of at least one of n, r and e is inputted. "s" may be changed. Furthermore, the notable design parameters may be changed, or the fixed value of the design parameter other than the notable design parameters may be changed. Then, the processing returns to the step S25 in FIG. 10 through a terminal B.

Figure 20:
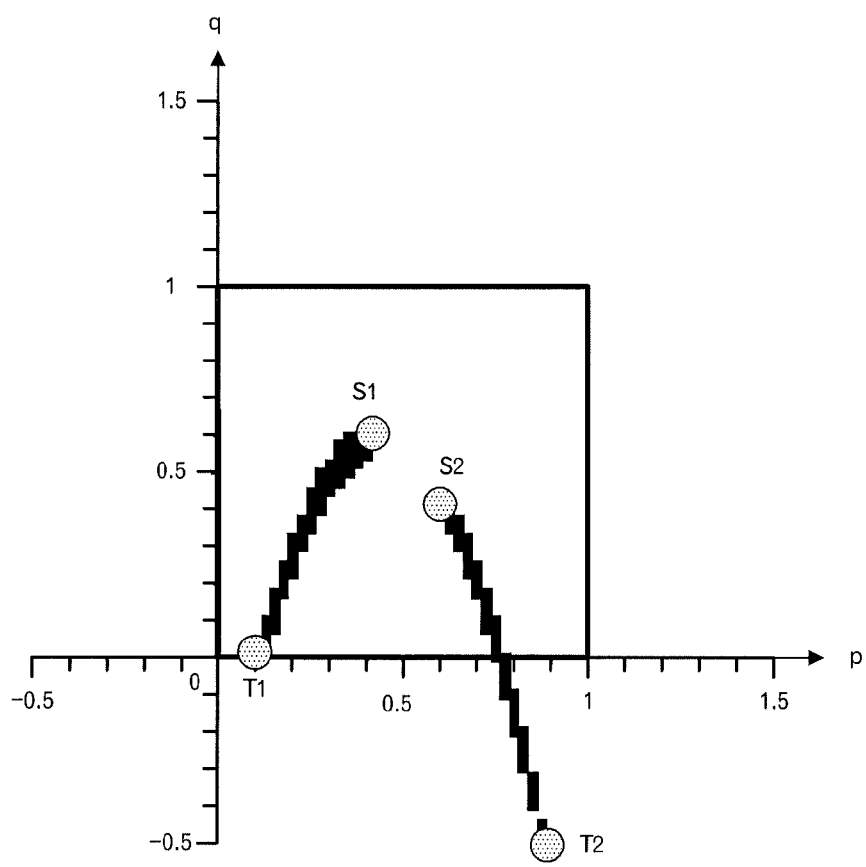
FIG. 20 is a diagram depicting an example of the route in the design parameter space in case of e=0.3.

The greater the division variable n and repetition variable r are, the smoother the boundary of the region is. On the other hand, the route width "e" relates to the size of the region that is determined to be true. When the logical expression of the solution is obtained as depicted in FIG. 18, the route having the thickness depicted, for example, in FIG. 20 is identified in the design parameter space in case of e=0.3. Thus, there are two routes, separately. Specifically, the start point S1=(0.407, 0.595) and start point S2=(0.602, 0.446) are calculated in the design parameter space. Moreover, the end points T1 and T2 in the design parameter space, which correspond to the end point B in the cost space, are calculated according to the expressions (1) and (2), as follows:

$T1=(0.137, 0.087)$ $T2=(0.872, -0.474)$

Incidentally, when the search ranges are $0 \leq p \leq 1$ and $0 \leq q \leq 1$, the route from the start point S2 is terminated on the way to the end point, and the end point T2 is not depicted. However, now, the search ranges broader than the aforementioned range are set. Because rough coordinates of the boundary between the route from the start point S2 and the search range can be calculated by the aforementioned processing, the points in the cost space, which correspond to the rough coordinates, can be obtained from the cost functions (1) and (2).

Figure 21:
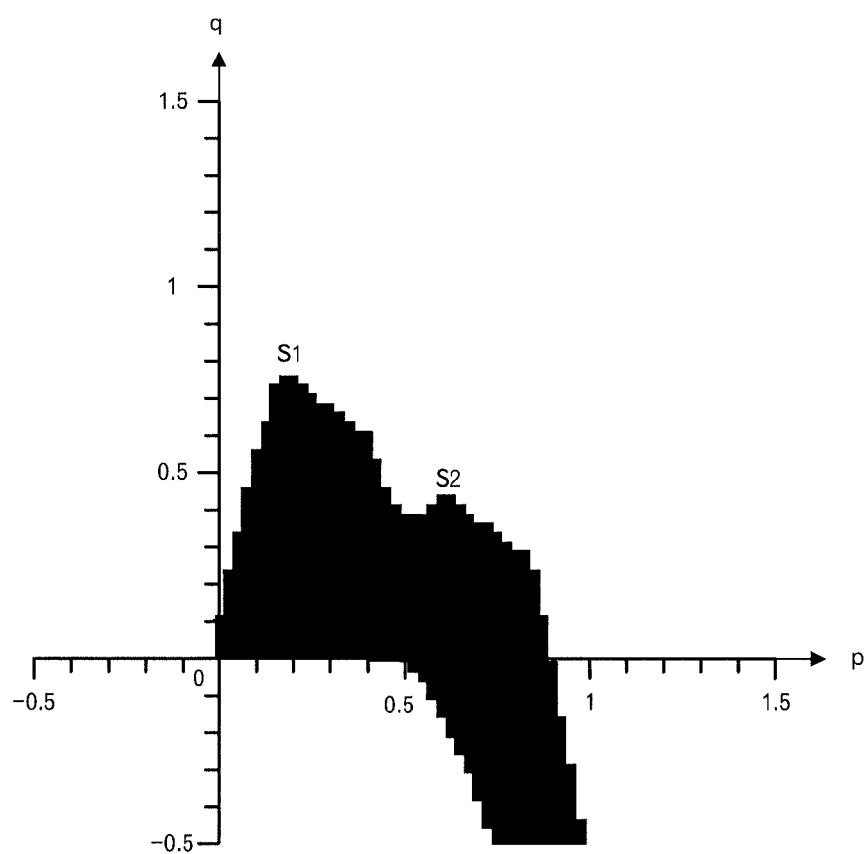
FIG. 21 is a diagram depicting an example of the route in the design parameter space in case of e=3.0.

Moreover, when e=3.0 is set in the same case, the broad region as depicted in FIG. 21 is obtained as the route in the design parameter space. Because it is too broad to understand the external form, the value of "e" should be small.

Figure 22:
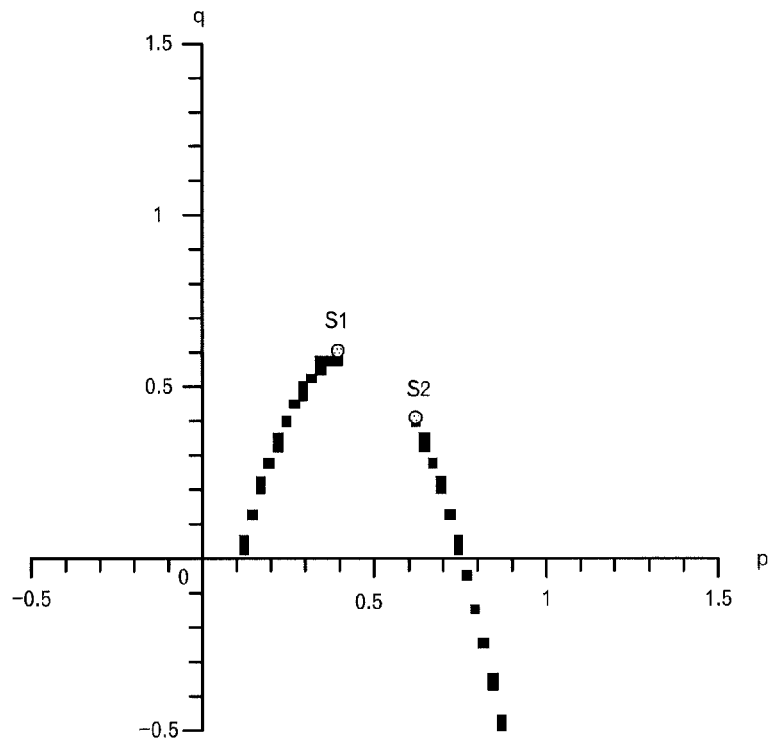
FIG. 22 is a diagram depicting an example of the route in the design parameter space in case of e=0.1.

On the other hand, when e=0.1 is set, desultory regions as depicted in FIG. 22 are obtained as the route in the design parameter space. Thus, the smaller "e" is, the smaller the region is. Therefore, it is difficult to understand the entire region. In an example of FIG. 22, it is possible to grasp the almost entire route, although the region is not continuous. However, when there is a branch, the point the branch occurs may not be identified. Therefore, the value of "e" should be large a little more.

Because there is such a characteristic, when the user considers that the display state is not appropriate, the user causes to generate the display data again after changing the drawing parameters and to display the generated display data again. When this processing is repeated until the user considers the display is appropriate, it becomes possible to obtain appropriate route display.

When the aforementioned processing is carried out, the route in the design parameter space, which correspond to the route in the cost space, can be displayed at high speed by the relatively simple processing.

Although the embodiment of this technique is explained above, this technique is not limited to this embodiment. For example, the functional block diagram is a mere example, and does not always correspond to the actual program module configuration.

In addition, the processing flows in FIGS. 4, 10 and 15 are mere examples, and this technique is not limited to those flows. As long as the processing result does not change, the order of the steps may be exchanged or the steps may be executed in parallel. For example, the order of the steps S21 to S25 may be exchanged.

Figure 23:
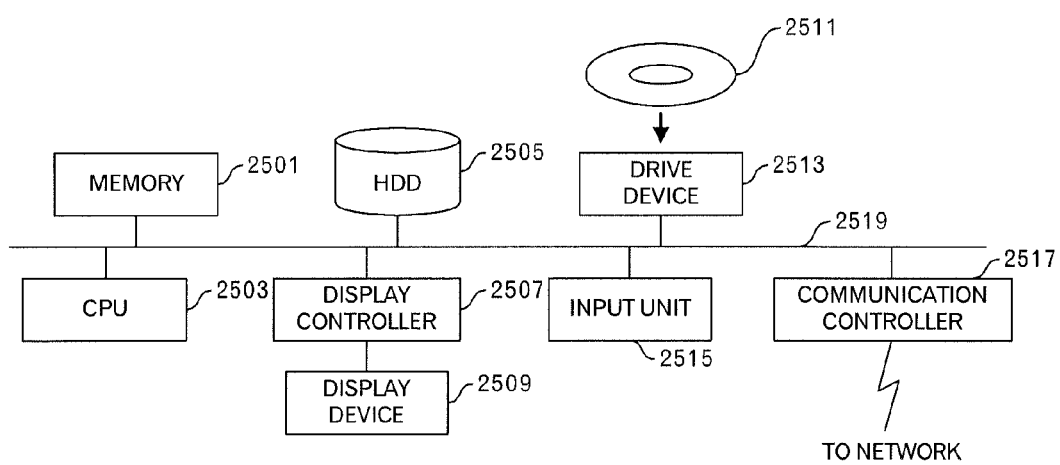
FIG. 23 is a functional block diagram of a computer.

In addition, the multi-objective optimization design support apparatus 100 is a computer device as shown in FIG. 23. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 23. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this technique, the application program to realize the aforementioned functions is stored in the computer-readable removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

In addition, the aforementioned functions may be realized by one computer or plural computers.

The aforementioned embodiment is outlined as follows:

A display processing method relating to this embodiment includes: (A) generating a constraint equation from data of an approximate expression of a cost function representing a relationship between a plurality of design parameters and a cost, data of a route in a cost space and data of a search range in a design parameter space, wherein the data of the approximate expression of the cost function is stored in a cost function storage unit, and the data of the search range and the data of the route are stored in a data storage unit; (B) obtaining a logical expression of a solution for the constraint equation from a quantifier elimination processing unit that carries out a processing according to a quantifier elimination method, wherein the obtained logical expression of the solution is stored in a solution logical expression storage unit; (C) substituting coordinates of each of a plurality of points within the search range in the design parameter space, which is stored in the data storage unit, into the logical expression of the solution stored in the solution logical expression data storage unit to determine, for each of the plurality of points, true or false of the logical expression of the solution; and (D) displaying a design parameter space in which a display object including a first point for which true is determined among the plurality of points, is disposed at the first point.

Because it takes a long time to exactly extract the expression corresponding to the route in the cost space from the logical expression of the solution for the constraint equation, the processing time is reduced by employing such a method, and furthermore, the route in the design parameter space, which corresponds to the route in the cost space, can be identified.

Incidentally, this display processing method may further include calculating coordinates of a first start point in the design parameter space, which corresponds to a second start point in the cost space, from the approximate expression of the cost function and the search range in the design parameter space. In such a case, the displaying may include displaying a second display object including the first start point, at the first start point in the design parameter space. Thus, it becomes easy for the user to grasp the start point and route. The end point may be displayed by disposing another display object.

Furthermore, the aforementioned data storage unit may further store a value of a route width. Moreover, the constraint equation and the logical expression of the solution may include a variable representing a route width. In such a case, the substituting may include substituting a value of the variable into the logical expression of the solution. Thus, it is possible to display, in the design parameter space, the region easy to see.

Moreover, the display processing method relating to this embodiment may further include: accepting a second value of the route width from a user; substituting the coordinates of each of the plurality of points within the search range in the design parameter space and the second value of the route width into the logical expression of the solution to determine, for each of the plurality of points, true or false of the logical expression of the solution; and displaying a design parameter space in which a display object including a first point for which true is determined is disposed at the first point. When the region of the route in the design parameter space is too thick or too thin, it is possible to adjust the width of the route to an appropriate width by such changing.

Furthermore, the substituting may include: dividing the search range in the design parameter space in gridlike fashion; and substituting coordinates of each lattice point into the logical expression of the solution to determine, for each of the plurality of lattice points, true or false of the logical expression of the solution, and the displaying may include: displaying the design parameter space in which the display object that has a predetermined size and includes a first lattice point for which true is determined is disposed at the first lattice point. In addition, the substituting may further include: dividing the display object having the predetermined size and disposed at the first lattice point in gridlike fashion; substituting coordinates at a center of each of third display objects generated by the dividing into the logical expression of the solution to determine, for the center of each of the third display objects, true or false of the logical expression of the solution; and removing the third display object for which false is determined, from the display object having the predetermined size. By carrying out such subdivision, the region having smooth boundaries is identified as the route in the design parameter space.

Moreover, the constraint equation may be an equation representing points in the cost space exists that satisfies a constraint that the approximate expression of the cost function is satisfied in the search range of the design parameter space, and a distance between a corresponding point in the cost space and the route in the cost space is less than a width of the route. Thus, it becomes possible to obtain an appropriate logical expression of the solution.

Figure 24:
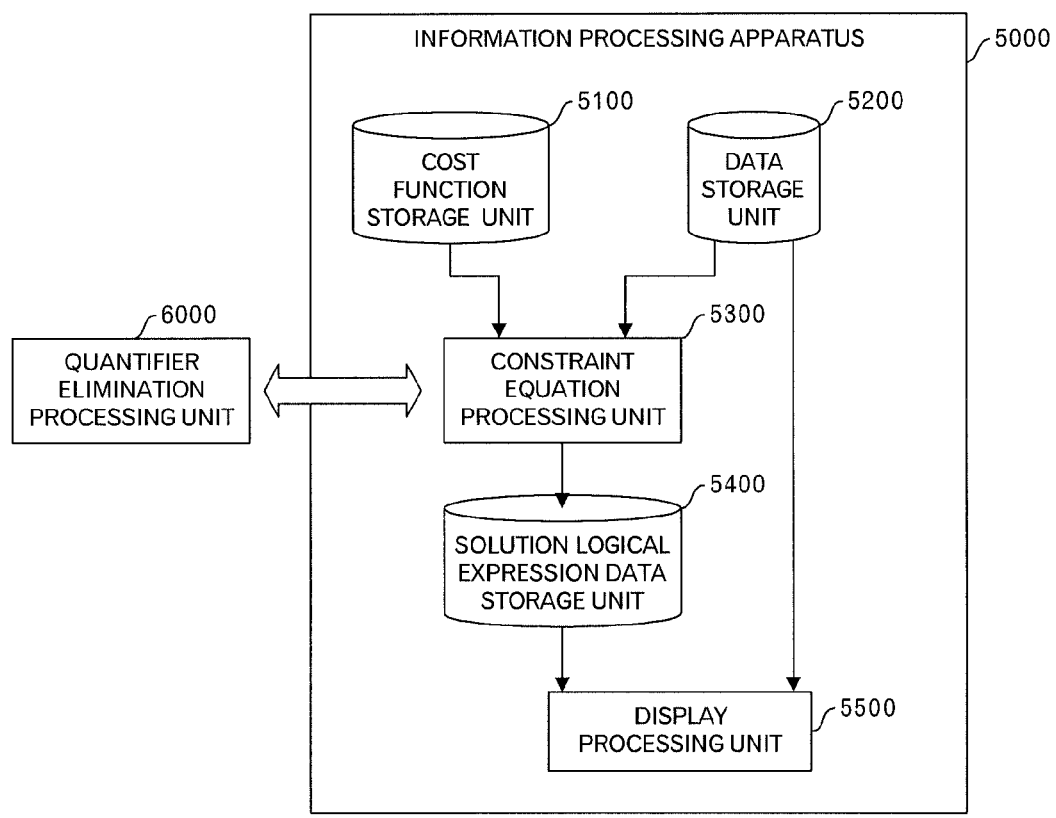
FIG. 24 is a functional block diagram of an information processing apparatus.

An information processing apparatus (FIG. 24: 5000) includes a cost function storage unit (FIG. 24: 5100) storing data of an approximate expression of a cost function representing a relationship between a plurality of design parameter and a cost; a data storage unit (FIG. 24: 5200) storing data of a route in a cost space and data of a search range in a design parameter space; a constraint processing unit (FIG. 24: 5300) that generates a constraint equation from the data of the approximate expression of the cost function, which is stored in the cost function storage unit, the data of the route and the data of the search range, which are stored in the data storage unit, and obtains a logical expression of a solution for the constraint equation from a quantifier elimination processing unit (FIG. 24: 6000) that carries out a processing according to a quantifier elimination method, and stores data of the logical expression of the solution into a solution logical expression data storage unit (FIG. 24: 5400); and a display processing unit (FIG. 24: 5500) that substitutes coordinates of each of a plurality of points within the search range in the design parameter space into the logical expression of the solution to determine, for each of the plurality of points, true or false of the logical expression of the solution, and displays a design parameter space in which a display object including a first point for which true is determined, among the plurality of points, is disposed at the first point.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing a computer to execute a procedure, the procedure comprising:
   connecting an approximate expression of a cost function representing a relationship between a plurality of design parameters and a cost, a route in a cost space and a search range in a design parameter space with logical conjunctions to generate a constraint equation;
   obtaining a logical expression of a solution for the constraint equation from a quantifier elimination processing unit that carries out a processing according to a quantifier elimination method;
   substituting coordinates of each of a plurality of points within the search range in the design parameter space into the logical expression of the solution to determine, for each of the plurality of points, true or false of the logical expression of the solution; and
   displaying a design parameter space in which a display object including a first point for which true is determined among the plurality of points, is disposed at the first point.

2. The computer-readable, non-transitory storage medium as set forth in claim 1, wherein the procedure further comprises:
   calculating coordinates of a first start point in the design parameter space, which corresponds to a second start point in the cost space, from the approximate expression of the cost function and the search range in the design parameter space, and
   wherein the displaying comprises displaying a second display object including the first start point, at the first start point in the design parameter space.

3. The computer-readable, non-transitory storage medium as set forth in claim 1, wherein the constraint equation and the logical expression of the solution include a variable representing a route width, and the substituting comprises substituting a value of the variable into the logical expression of the solution.

4. The computer-readable, non-transitory storage medium as set forth in claim 3, wherein the procedure comprises:
   accepting a second value of the route width from a user;
   substituting the coordinates of each of the plurality of points within the search range in the design parameter space and the second value of the route width into the logical expression of the solution to determine, for each of the plurality of points, true or false of the logical expression of the solution; and
   displaying a design parameter space in which a display object including a first point for which true is determined is disposed at the first point.

5. The computer-readable, non-transitory storage medium as set forth in claim 1, wherein the substituting comprises:
   dividing the search range in the design parameter space in gridlike fashion; and
   substituting coordinates of each lattice point into the logical expression of the solution to determine, for each of the plurality of lattice points, true or false of the logical expression of the solution, and
   the displaying comprises:
   displaying the design parameter space in which the display object that has a predetermined size and includes a first lattice point for which true is determined is disposed at the first lattice point.

6. The computer-readable, non-transitory storage medium as set forth in claim 5, wherein the substituting further comprises:
   dividing the display object having the predetermined size and disposed at the first lattice point in gridlike fashion;
   substituting coordinates at a center of each of third display objects generated by the dividing into the logical expression of the solution to determine, for the center of each of the third display objects, true or false of the logical expression of the solution; and
   removing the third display object for which false is determined, from the display object having the predetermined size.

7. The computer-readable, non-transitory storage medium as set forth in claim 1, wherein the constraint equation is an equation representing points in the cost space exists that satisfies a constraint that the approximate expression of the cost function is satisfied in the search range of the design parameter space, and a distance between a corresponding point in the cost space and the route in the cost space is less than a width of the route.

8. A display processing method comprising:
   connecting, by a computer, an approximate expression of a cost function representing a relationship between a plurality of design parameters and a cost, a route in a cost space and a search range in a design parameter space with logical conjunctions to generate a constraint equation;
   obtaining, by the computer, a logical expression of a solution for the constraint equation from a quantifier elimination processing unit that carries out a processing according to a quantifier elimination method;
   substituting, by the computer, coordinates of each of a plurality of points within the search range in the design parameter space into the logical expression of the solution to determine, for each of the plurality of points, true or false of the logical expression of the solution; and
   displaying, by the computer, a design parameter space in which a display object including a first point for which true is determined among the plurality of points, is disposed at the first point.

9. An information processing apparatus comprising:
   a cost function storage unit storing data of an approximate expression of a cost function representing a relationship between a plurality of design parameter and a cost;
   a data storage unit storing data of a route in a cost space and data of a search range in a design parameter space;
   a constraint processing unit that connects the approximate expression of the cost function, which is identified by the data stored in the cost function storage unit, the route and the search range, which are identified by the data stored in the data storage unit, with logical conjunctions to generate a constraint equation, and obtains a logical expression of a solution for the constraint equation from a quantifier elimination processing unit that carries out a processing according to a quantifier elimination method; and a display processing unit that substitutes coordinates of each of a plurality of points within the search range in the design parameter space into the logical expression of the solution to determine, for each of the plurality of points, true or false of the logical expression of the solution, and displays a design parameter space in which a display object including a first point for which true is determined, among the plurality of points, is disposed at the first point.

10. An information processing apparatus comprising:
a processor configured to execute a process, the process comprising:
   connecting an approximate expression of a cost function representing a relationship between a plurality of design parameters and a cost, a route in a cost space and a search range in a design parameter space with logical conjunctions to generate a constraint equation;
   obtaining a logical expression of a solution for the constraint equation from a quantifier elimination processing unit that carries out a processing according to a quantifier elimination method;
   substituting coordinates of each of a plurality of points within the search range in the design parameter space into the logical expression of the solution to determine, for each of the plurality of points, true or false of the logical expression of the solution; and
   displaying a design parameter space in which a display object including a first point for which true is determined among the plurality of points, is disposed at the first point.

* * * * *